United States Patent [19]
Dandliker et al.

[11] 3,823,374
[45] July 9, 1974

[54] METHOD AND APPARATUS FOR THE PRESENTATION OF FREQUENCY

[75] Inventors: Rene Dandliker; Paul D. Iten, both of Oberrohrdorf, Switzerland

[73] Assignee: Aktiengesellschaft Brown, Boveri & Cie., Baden, Switzerland

[22] Filed: Oct. 4, 1972

[21] Appl. No.: 296,062

[30] Foreign Application Priority Data
Oct. 7, 1971 Switzerland.................. 14710/71

[52] U.S. Cl............................................. 324/79 R
[51] Int. Cl............................................ G01r 23/14
[58] Field of Search............................ 324/79, 82

[56] References Cited
UNITED STATES PATENTS
2,877,344   3/1959   Dodington.................. 324/82 X Primary Examiner—Alfred E. Smith
Attorney, Agent, or Firm—Toren, McGeady and Stanger

[57] ABSTRACT

A method of presenting frequency whereby an input signal is compared with a comparison frequency which is variable in accordance with a control signal. Agreement between a frequency contained in the input signal and the comparison frequency has the effect of producing an indication signal and, by relating the corresponding deviation of the control signal to the indication signal, an output signal. When applied to an input signal having a defined and periodically variable instantaneous frequency, the modulation periods of the comparison frequency exhibit a different phase position relative to the periods of the instantaneous frequency in at least two consecutive periods of the instantaneous frequency.

17 Claims, 6 Drawing Figures

METHOD AND APPARATUS FOR THE PRESENTATION OF FREQUENCY

BACKGROUND OF THE INVENTION

This invention relates to signal analyzers and particularly to means and methods for presenting the frequency variation of high frequency signals.

U.S. Pat. No. 3 582 957 discloses devices which compare an input signal with a comparison frequency variable in accordance with a control signal and which produce an indication signal and an output signal when the comparison frequency agrees with a frequency component contained in the input signal by relating the corresponding deviation or instantaneous value of the control signal to said indication signal. That case, however, is concerned only with the presentation of frequency spectra, i.e. input signals not presenting one defined instantaneous frequency, but comprising a plurality of frequency components. The frequency spectra are scanned by a periodically variable comparison frequency, but presentation of periodically variable spectra is possible only if the scanning period, i.e. the period of variation of the comparison frequency, is very much shorter than the period of change of the spectrum to be presented.

The present invention, in contrast, relates to high-frequency signals for which it is possible to define an instantaneous value of the frequency. The conditions regarding frequency relationships and system size under which it is acceptable to assume essentially only one instantaneous frequency in the transmission of high-frequency signals in linear systems, have been described (cf. J.R. Carson and T.C. Fry, Bell System Techn. Journ. 16, 1937, p, 513). Application of the invention requires that appropriate conditions of this or a similar nature be satisfied so that a defined instantaneous frequency can be assumed at least as an approximation. For simplicity, the term "instantaneous frequency" is used in the following to denote specifically the instantaneous value of an input frequency to be presented.

The object of the invention in this context is to create a method and apparatus for presentation of periodically variable instantaneous frequencies with which it is possible at relatively small expense to achieve a high degree of insensitivity to parasitic amplitude modulation and a comparatively large linear range of the frequency characteristic.

SUMMARY OF THE INVENTION

This object is achieved by the method of the invention in that when applied to an input signal having a defined and periodically variable instantaneous frequency, the modulation periods of the comparison frequency exhibit a different phase position relative to the periods of the instantaneous frequency in at least two consecutive periods of the instantaneous frequency.

Apparatus to achieve the object of the invention comprises a control signal generator for application to an input signal of defined and periodically variable instantaneous frequency, this control signal generator having a control signal period which differs from the period of the instantaneous signal by a fraction of one period.

By comparing the instantaneous frequency with a comparison frequency having a modulation period which is relatively little different, and by determining coincidence between the two frequencies, and also by allocating to the coincidence signal a signal deviation corresponding to the comparison frequency, it is possible to produce an output signal which corresponds to the instantaneous frequency and is without demodulation in the customary sense. Demodulation of the high-frequency signal on a more or less amplitude-dependent frequency characteristic is thus dispensed with, resulting in the desired high degree of insensitivity of the high-frequency signal to parasitic amplitude modulation. This has the effect of simplifying both the method and the associated apparatus. Furthermore, narrow-band transmission elements can be used for comparing the frequencies and deriving the coincidence signal, thus greatly reducing the interference produced in the transmission channel and which is dependent on the bandwith. It is also possible to achieve in a simple manner a high degree of linearity in reproducing the instantaneous frequency in the output signal, because this linearity depends essentially on the simple, and easily influenced, functional relationship between comparison frequency and control signal. An important advantage of the invention is that, by making the difference between the periods of the instantaneous frequency and comparison frequency suitably small, the behaviour of the instantaneous frequency can be scanned with virtually any desired degree of precision, provided the periodic behaviour of the instantaneous frequency varies sufficiently slowly. Nevertheless, a scanning period substantially shorter than the period of change of the instantaneous frequency is not essential for such fine scanning with correspondingly accurate reproduction, which in many cases results in a beneficial simplification and reduced expense. The phase position of the periods of the comparison frequency can then be different in only two consecutive periods, and held constant in two or more other consecutive periods. In this way it is possible to reduce or compensate random errors, for example, provided the systematic variation of the periodic behaviour of the instantaneous frequency, corresponding to the measuring effect, is sufficiently slow.

BRIEF DESCRIPTION OF THE DRAWINGS

The invention will now be explained in more detail with reference to the accompanying drawings, in which.

DETAILED DESCRIPTION OF PREFERRED EMBODIMENTS

Figure 1:
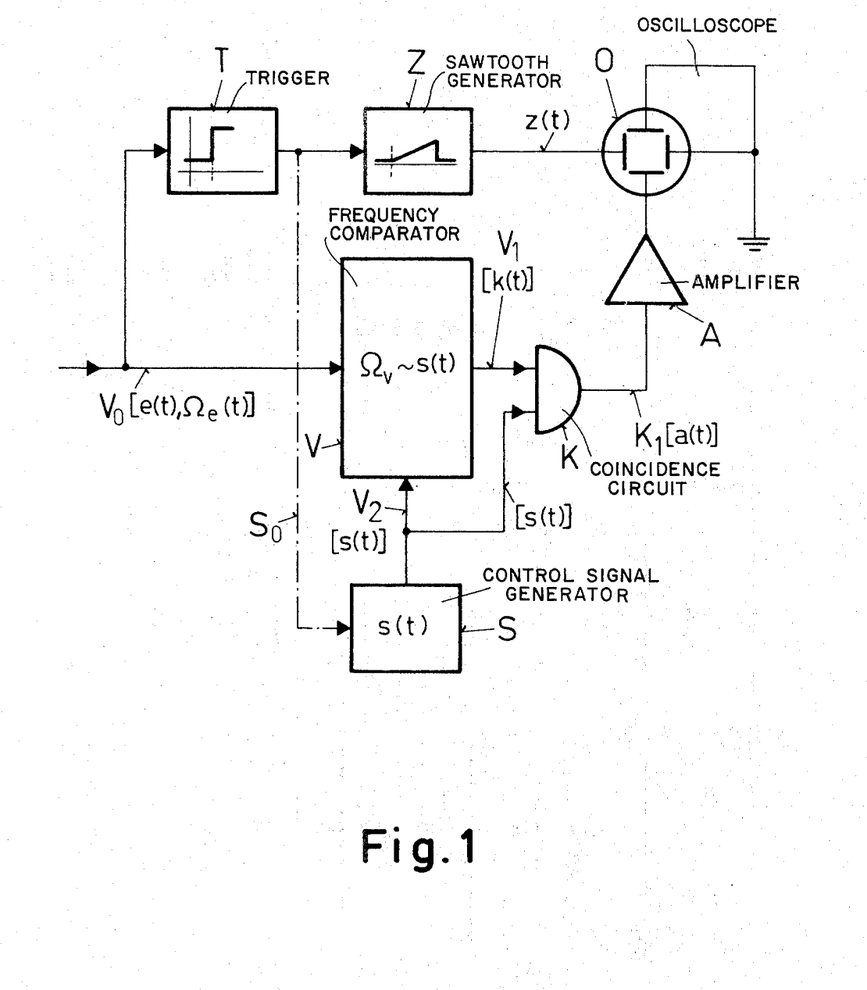
FIG. 1 is the basic circuit diagram of apparatus for determining instantaneous frequency.

As can be seen from the basic circuit diagram of FIG. 1, an essential component of the apparatus is a frequency comparator V which is connected on one side via an output $V_1$ to a suitable input of a coincidence circuit K, and on the other side via a control input $V_2$ to the output of a control signal generator S. A high-frequency input signal $e(t)$ having an instantaneous frequency $\Omega_e(t)$ variable with respect to time in accordance with a prescribed information content, is fed to the frequency comparator V by way of an input $V_o$. A comparison frequency $\Omega_v$ which is controlled via input $V_2$, and hence is functionally dependent on the output signal of control signal generator S, is generated in frequency comparator V in a manner described in more detail below and compared, also in a manner described more fully below, with the input signal frequency, i.e. with the instantaneous frequency $\Omega_e$ of input signal e, in order to produce a coincidence signal $k(t)$ at output $V_1$. In the considered example it is assumed that the comparison frequency $\Omega_v$ is proportional to the control signal $s(t)$ generated in generator S.

The control signal $s(t)$ is fed to a second input of coincidence circuit K in the manner shown in FIG. 1. The action of coincidence circuit K is to be regarded essentially as an AND gate with analogue transfer, i.e. with equal amplitude in the considered example, of control signal $s(t)$ between the second input and output $K_1$, depending on whether the coincidence signal $k(t)$ is present at the first input, i.e. at output $V_1$ of the comparator circuit.

The output signal $a(t)$ obtained at the output $K_1$ of the coincidence circuit for discrete instants of agreement between $\Omega_e$ and $\Omega_v$ is fed via an output amplifier A to the vertical deflection of an oscilloscope O. The time sweep of the oscilloscope necessary for displaying the behaviour of the instantaneous frequency is produced, as shown in FIG. 1, by means of a circuit loop which comprises essentially a trigger T and a saw-tooth generator Z controlled by the trigger and having a time-base signal $z(t)$ as its output, and is connected to the horizontal deflection of the oscilloscope. The time sweep of the display device is derived from the onset of the input signal $e(t)$ by way of the circuit loop mentioned and is entirely suitable for presenting both non-recurrent and periodic behaviour of the instantaneous frequency $\Omega_e$ of the input signal. In the latter case, for example, repeated sweeps, each with one or more coincidence output signals, are made for each period of the input signal or instantaneous frequency. The entire signal pattern is scanned progressively by suitably shifting the coincidence points within the succession of periods. If the scanning frequency is sufficiently high, i.e. there is a suitably high number of coincidence points per unit time, it is also possible to represent individual periods of the instantaneous frequency, or non-recurrent phenomena of this nature. Synchronisation, with superimposed, progressive time delay between the control signal $s(t)$ and the output signal of trigger T is particularly appropriate in the case of periodic phenomena, and this is indicated in FIG. 1 by the chain-dotted link $S_o$.

It is further to be assumed that the trigger T and sawtooth generator Z shown in the basic circuit diagram of FIG. 1 contain the necessary amplification devices. Also, the trigger is to be considered as provided with the necessary signal converters, and in particular with a simple frequency demodulator which is not critical in operation and serves as an input element for deriving a synchronising signal from suitable variations of the instantaneous frequency of the input signal. Other suitable synchronising devices may also be used, however; direct synchronising with a signal generator such as the shaft of a machine, for example, if the input signal is derived from this device. It is further to be understood that not only high-frequency input signals can be processed, but also, if required, direct optical input signals. This latter case is described in detail in the following description of the next example.

Figure 2:
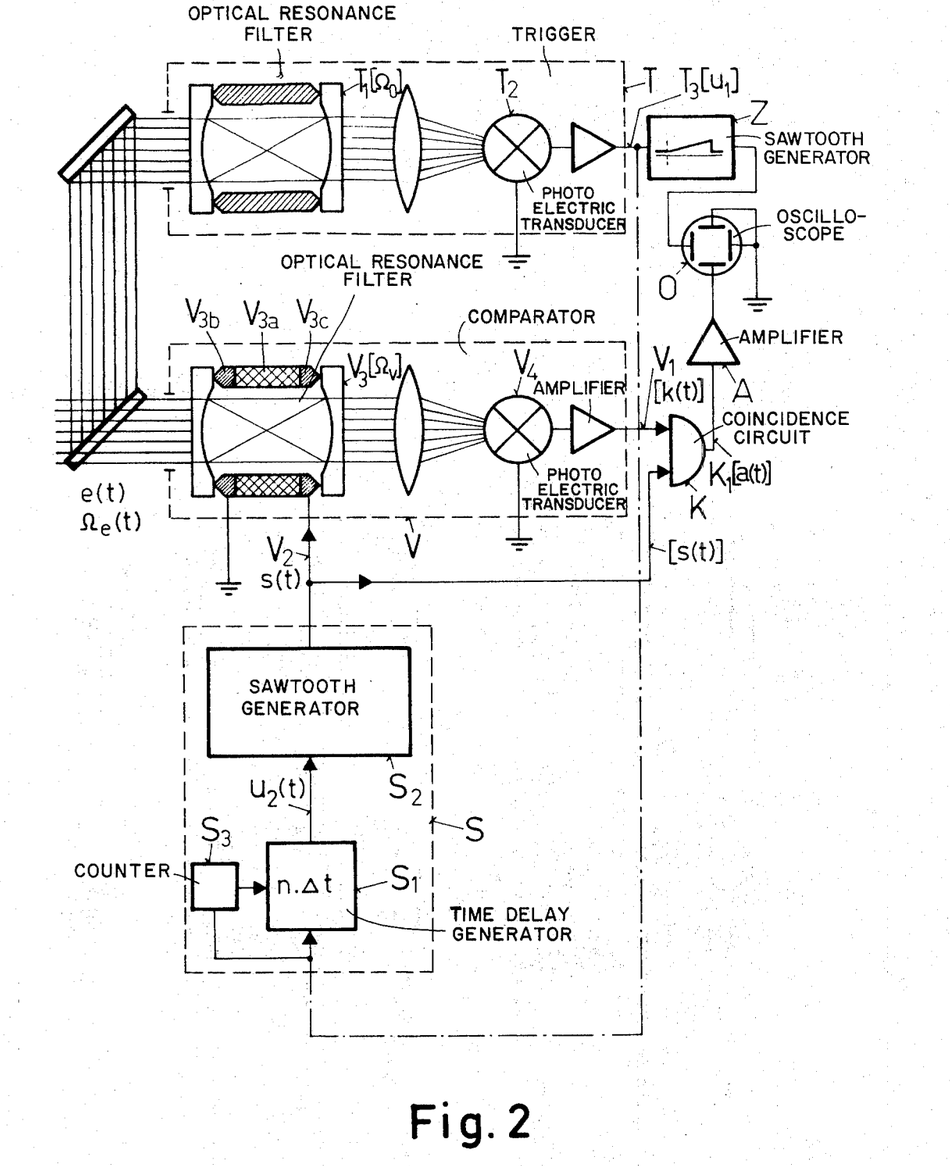
FIG. 2 is the block diagram of a special version of the apparatus shown in FIG. 1.

The example shown in FIG. 2 incorporates an optical/electronic frequency comparator V and optical/electronic trigger T. An input $e(t)$ in the form of a light beam of variable instantaneous frequency $\Omega_e(t)$ is fed to both devices in parallel by way of a normal mirror system. The input element of the frequency comparator V is in this case an optical resonance filter $V_3$ with a narrow pass band having a centre frequency which is variable in accordance with a control signal $s(t)$ introduced at input $V_2$. This pass frequency thus constitutes the comparison frequency $\Omega_v$. In the example considered the optical filter is shown as a Fabry-Perot interferometer with concave, partially translucent reflective surfaces and piezoelectric spacer element $V_{3a}$. The distance between the reflective surfaces, and hence the resonant or pass frequency of the filter, can thus be varied by control signal $s(t)$ which is fed in the form of an appropriate voltage to the ring electrodes $V_{3b}$ and $V_{3c}$ of spacer element $V_{3a}$. Thus, when $\Omega_e$ and $\Omega_v$ are in agreement a light pulse appears at the filter output which is converted in a subsequent photoelectric transducer $V_4$ into an electrical coincidence signal $k(t)$ at output $V_1$.

The trigger in the example shown in FIG. 2 is also an optical/electronic device incorporating an optical resonance filter $T_1$ followed by a photoelectric transducer $T_2$. Filter $T_1$ is again a Fabry-Perot interferometer, but in this case with a fixed pass frequency, and produces a synchronous pulse $u_1$ at output $T_3$ of the trigger each time the instantaneous frequency $\Omega_e$ is in agreement with the fixed pass frequency $\Omega_o$ of filter $T_1$. Output $T_3$ then starts the horizontal deflection of an oscilloscope O in the manner already described in connection with FIG. 1, and also synchronises a control signal generator S. In the considered example this is composed of a time-delay generator $S_1$ which on receiving a succession of synchronous pulses $u_1$ releases a triggering pulse $u_2$ after a time lag which increases in equal steps $\Delta t$, and of a saw-tooth generator $S_2$ triggered by the input of the time-delay generator, i.e. on expiry of the time delay interval $n.\Delta t$. Generator $S_2$ then supplies saw-tooth-shaped control signals $s(t)$ to the input $V_2$ of frequency comparator V at progressively longer intervals $n.\Delta t$ after the synchronous pulses $u_1$. The operating principle of the apparatus shown in FIG. 2 is now described with reference to the diagram in FIG. 3.

Figure 3:
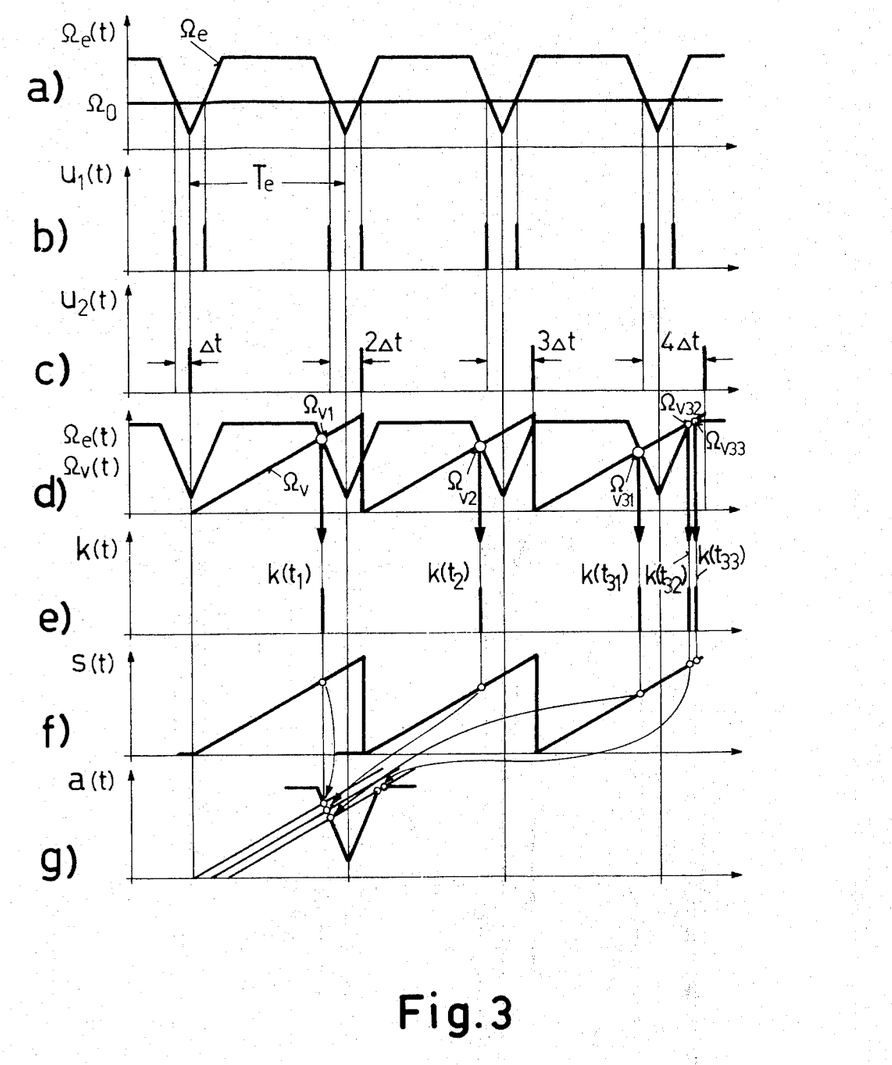
FIG. 3 is a signal/time diagram to illustrate the operating principle of the apparatus shown in FIG. 2.

Line a) of FIG. 3 shows, by way of example, a periodic curve of input signal frequency or instantaneous frequency $\Omega_e$ with a period of duration $T_e$, and the fixed pass frequency $\Omega_o$ of trigger T. Beneath this, line b) shows the synchronous pulses $u_1$ which, when an input signal is present, always occur in pairs when there is agreement between $\Omega_e$ and $\Omega_o$, and of which only the first is used for controlling the time-delay generator $S_1$. The delay intervals $\Delta t$, which are added successively until restarted after a prescribed number of synchronous pulses, are shown in line c) together with the corresponding total time delays $n.\Delta t$ and the subsequent triggering pulses $u_2$.

To reset the time-delay generator, FIG. 2 includes a counter $S_3$ which is controlled by the synchronous pulses $u_1$ and acts on a reset input of the time-delay generator $S_1$.

Line d) in FIG. 3 shows the coincidence points $\Omega_{v1}$, $\Omega_{v2}$ and $\Omega_{v31}$ to $\Omega_{v33}$ which result from combining the input signal frequency $\Omega_e$ with the comparison frequency $\Omega_v$, which rises in the form of a saw-tooth curve and is triggered after delay intervals $n.\Delta t$. The corresponding coincidence signals $k(t_1)$, $k(t_2)$ and $k(t_{31})$ to $k(t_{33})$ are shown in line e), while line f) shows the resulting coincidence points of the instantaneous values of control signal $s(t)$, which is proportional to the comparison frequency. The numbering of these coincidence points over time (t) is easily understood by referring to line e). The coincidence points in successive periods $T_e$ are then recorded one above the other within the same recording interval by means of the horizontal deflection of oscilloscope O, the overall result of such point-by-point scanning being presentation of the curve of instantaneous frequency $\Omega_e$ in the form of output signal $a(t)$ as shown in line g) of FIG. 3.

The procedure described above is based on the fact that for each period of the input signal there is at least one intersection of the comparison frequency and instantaneous frequency, with a corresponding coincidence signal. It is also possible, however, that a number of coincidence points occur within one period, as indicated in the extreme right-hand section of FIG. 3. The manner in which the coincidence points are allocated to the corresponding scanning points of the output signal on the oscilloscope display is indicated by curved arrows from line f) to line g) in FIG. 3.

It is also to be noted that in may cases, exact control of the time shift of the comparison frequency in successive periods $T_e$ is not necessary, and in a simple form of the invention can be replaced by a difference in the sequence frequency of the then free-running control signal generator S relative to the sequence frequency of the input signal. In connection with the form shown in FIG. 2 it should further be noted that a similar configuration for high-frequency electrical input signals is easily achieved by replacing the optical resonance filter with electronically varied frequency by an electronic high-frequency filter, also with electronically varied frequency. Electronic filters of this kind are known and are available for the purposes of this invention (cf. Electronic Design, No.24, 22 Nov. 1970, pages 74 to 77).

Figure 4:
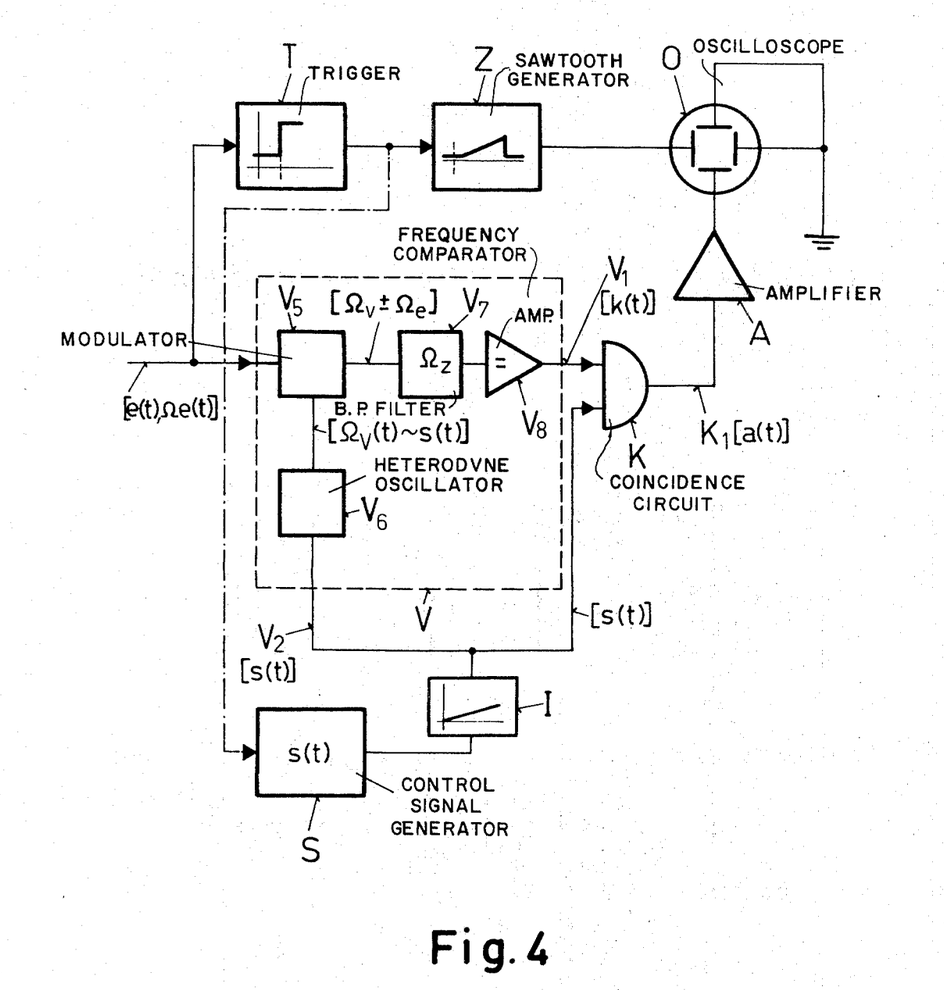
FIG. 4 is the block diagram of a further example of the apparatus shown in FIG. 1.

The version shown in FIG. 4, which otherwise corresponds to the basic circuit of FIG. 1, has as its frequency comparator V a normal heterodyne frequency analyser consisting essentially of a voltage-controlled heterodyne oscillator $V_6$, a modulator $V_5$ driven by the heterodyne frequency, i.e. $\Omega_v$, and by the input signal frequency or instantaneous frequency $\Omega_e$, and further of a narrow band-pass filter $V_7$, with pass frequency $\Omega_z$, located after the modulator output. By way of an output amplifier $V_8$ and output $V_1$ this arrangement provides the coincidence circuit K with a coincidence signal $k(t)$ corresponding to that of the version described previously. At the output of modulator $V_5$, which is in the form of a product modulator, there appear the two modulation frequencies $\Omega_v + \Omega_e$ and $\Omega_v - \Omega_e$. The pass frequency of narrow band-pass filter $V_7$ is then so chosen that only the latter of these difference frequencies is transmitted, provided the instantaneous values of $\Omega_e$ and $\Omega_v$ satisfy the condition $\Omega_v - \Omega_e = \Omega_z$. This then yields the coincidence signal mentioned. The operating principle of the circuit shown in FIG. 4 can be seen from the diagram in FIG. 5, where lines a) to c) and the corresponding steps of the process are identical to the illustration shown in FIG. 3, and thus require no further explanation.

Line d) shows the periodic behavior of the comparison frequency, i.e. the frequency of the heterodyne oscillator, with stepwise increasing time delay in accordance with the triggering pulses $u_2$ depicted in line c), and starting on the ordinate axis from the lowest value of $\Omega_v$, which in this case corresponds to the fixed intermediate frequency $\Omega_z$. Line e) shows this fixed intermediate frequency and the interacting difference frequency $\Omega_v - \Omega_e$ obtained from the output of the modulator. When these two last-mentioned frequencies coincide, this again results in a coincidence signal $k(t)$. The corresponding pulses are shown in line f) of FIG. 5. This line corresponds to line e) of FIG. 3. The relationship to the deviations of the control signal $s(t)$ and the composition of the output signal $a(t)$ as shown in lines f) and g) of FIG. 3 remain unchanged and are therefore not repeated.

Figure 5:
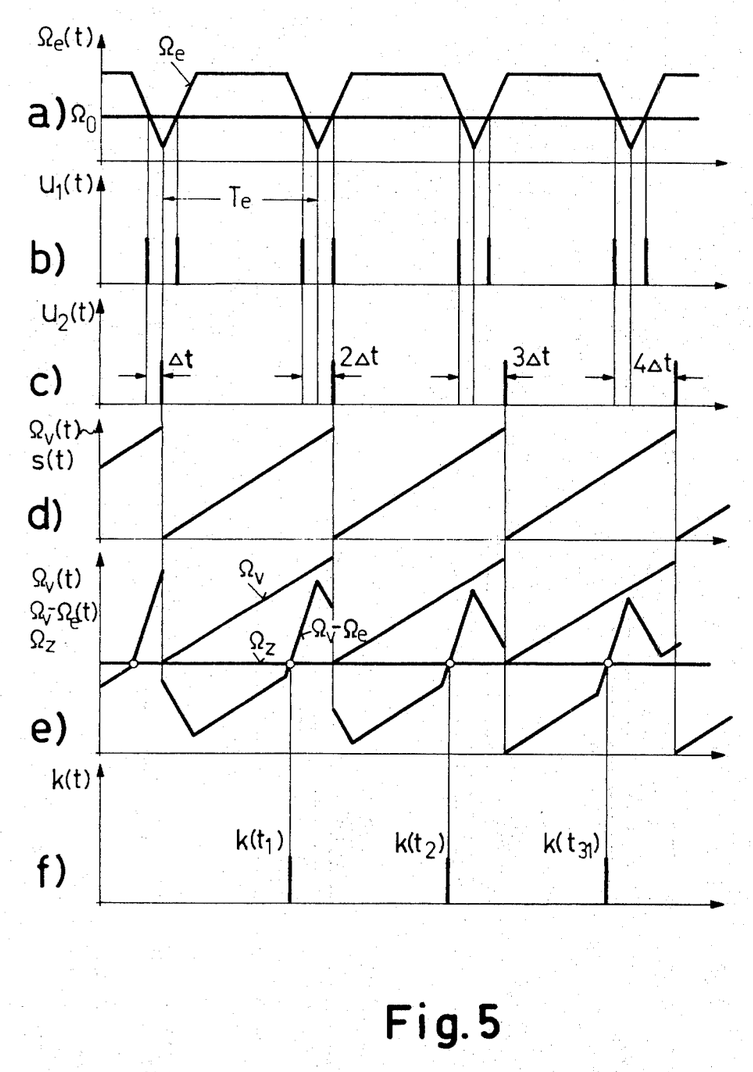
FIG. 5 is a signal/time diagram to illustrate the operating principle of the apparatus shown in FIG. 4; and, FIG. 6 is a number of time diagrams for different patterns of the comparison-frequency control signal.
Figure 6:
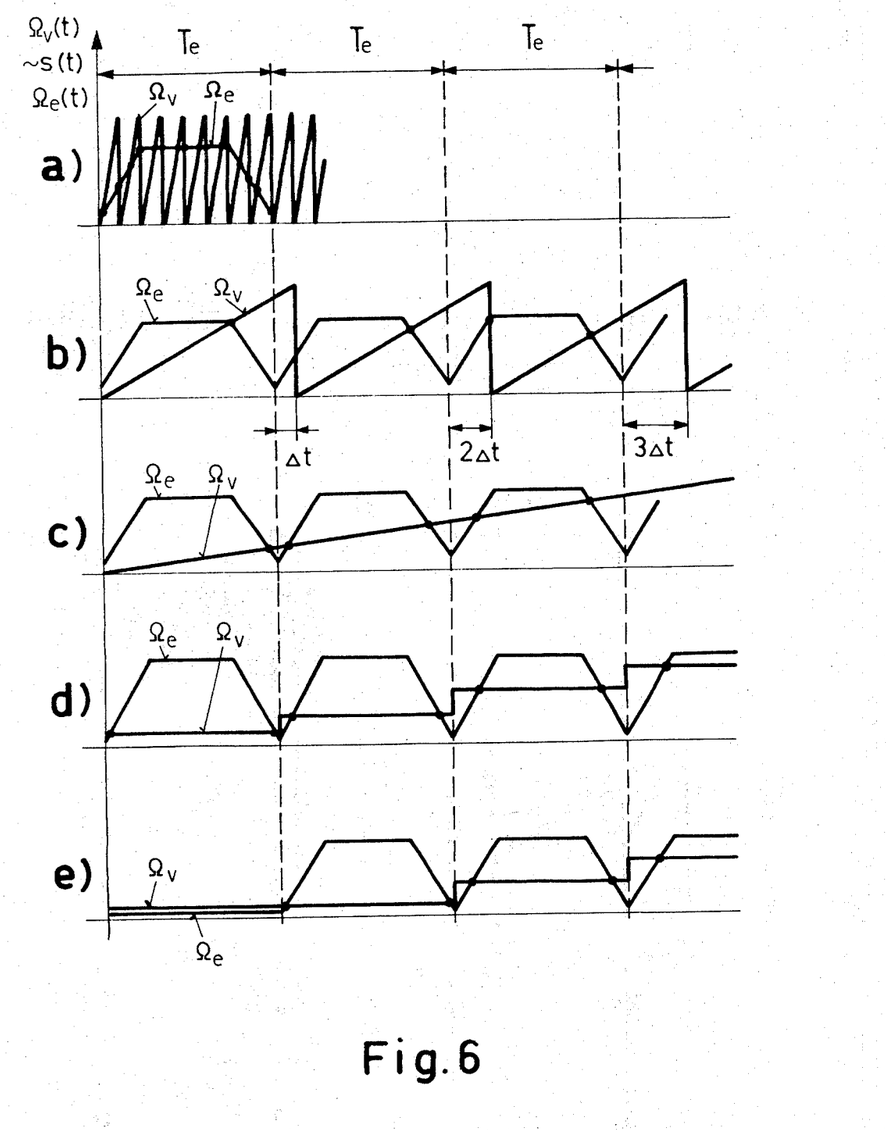

FIG. 6 summarises a number of possible relationships between time and control signal $s(t)$ or comparison frequency $\Omega_v$. The behaviour of the input signal or instantaneous frequency as depicted in FIGS. 3 and 5 is shown superimposed in the various lines of FIG. 6. The curve of the control signal in line a) of FIG. 6 is a saw-tooth curve of the comparison frequency shown with a scanning sequence frequency higher than the sequence frequency of the input signal. An appropriately high scanning sequence frequency results in a large number of coincidence points within a single period, i.e. corresponding resolution of the time behaviour within one period. This procedure is therefore particularly suitable for representing one-time phenomena.

The curve of the comparison frequency shown in line b) corresponds to the examples described in relation to FIGS. 3 and 5 and is repeated here only for the sake of completeness.

The conditions illustrated by line c), with a slowly and uniformly rising comparison frequency, also yields a number of coincidence points with periodic input signals which is suitable for display purposes, and is principally notable for the simplicity both of the process and of the associated apparatus, since there is no need for synchronisation or stepwise increases in the time delay of the control signal. Here also, a number of ramp-shaped increases can be applied in succession if suitable provision is made for resetting after certain intervals. With this method, accumulations of coincidence points can occur under certain circumstances in individual portions of the input signal curve, but in may cases these have no disturbing influence. In the mode represented by line d), operation within each period of the input signal is at constant comparison frequency, although this frequency increases in steps between one period and the next. Thus in certain cases of the input signal curve, more uniform scanning can be achieved than in the mode shown in line c). The version represented by line d) also has the advantage that there is no progressive stepwise retardation of the control signal.

Finally, line e) shows the possibility, based on the mode of operation illustrated by line d), of leaving the comparison frequency unchanged for a number of periods of the input signal if, for example, the input signal is present, or absent, only randomly. The comparison frequency is then initiated only when coincidence points occur. Good reproduction can be achieved in this way even when there is heavy interference on the input signals. On the other hand, it is also possible to produce a value averaged over a number of periods with coincident $\Omega_v$.

It is also to be noted that instead of a conjunction as the coincidence circuit, the coincidence signals can, for example, modulate the intensity of the oscilloscope beam, in which case the control signals continuously actuate the vertical deflection. In general, the term "presentation" in the sense of the invention is understood to denote not only pictorial representation but any form of retrieval of a signal allocated to the input signal frequency.

We claim:

1. Apparatus for presenting frequency, comprising a frequency comparator with controllable comparison frequency and supplied with an input signal and comprising an output which is activated on agreement between a frequency contained in the input signal and the comparison frequency, and a control signal generator with periodically variable output signal actively connected to a control input of the frequency comparator, and further comprising a coincidence circuit actively connected by way of appropriate inputs both to the output of the frequency comparator and to the output of the control signal generator, the coincidence circuit having a signal output controlled by the output of the control signal generator as a function of the presence of a coincidence signal, in which the frequency comparator (V) for application to an optical input signal comprises an optical resonance filter ($V_3$) which can be modulated electronically in accordance with a prescribed control signal (s), and an optical/electrical transducer ($V_4$).

2. The method of representing the frequency characteristics of an input signal whose frequency varies periodically at a given input period, which comprises the step of generating frequency variable comparison signal and producing an indicator signal each time the frequency of the comparison signal exhibits a predetermined relation with the frequency of the input signal, the step of generating a periodically varying control signal having a varying value with a control period, the step of varying the comparison frequency on the basis of the varying value of the control signal, the step of sampling the value of the control signal at each indicator signal and producing an output signal corresponding to the value sampled, the step of generating the control signal including imparting to the value a control period which constrains the frequency of the comparison signal to exhibit a period which is out of phase with at least two consecutive input periods.

3. The method as in claim 2 wherein the step of generating and producing includes producing the indicator signal each time the frequency of the input signal and the frequency of the comparison signal are in agreement.

4. The method as in claim 3 wherein the step of generating the control signal includes changing the frequency of the comparison signal progressively over a plurality of input periods and varying the frequency of the comparison signal. so that the variation is small compared with the range of input frequencies.

5. The method as in claim 4, wherein the step of generating the control signal includes varying the frequency of the comparison signal in steps synchronously with the input periods.

6. The method as in claim 3, wherein the step of generating the control signal includes holding the frequency of the comparison signal at least approximately constant during a number of input signals and changing the frequency of the comparison signal by a small amount relative to the range of frequencies of the input signal.

7. The method as in claim 3, further comprising the step of generating a periodic time base signal having a period synchronous with the input period and applying the output signal to the time base signal.

8. An apparatus for representing the frequency characteristic of an input signal having a periodically varying frequency, comprising frequency processing means for generating a frequency variable comparison signal and producing an indicator signal each time the frequency of the input signal has a predetermined relation with the frequency of the comparison signal, control signal generating means coupled to said processing means for generating a periodically varying control signal whose varying value has a control period and for varying the comparison frequency on the basis of the varying value of the control signal, coincidence means coupled to said processing means and said control signal generating means for sampling the value of the control signal at each indicator signal and producing an output signal corresponding to the value sampled, said control signal generating means generating the control signal so that the control period differs from the period of the frequency variation of the input signal by a fraction of the period of the input signal.

9. An apparatus as in claim 8, wherein said frequency processing means includes means for producing the indicator signals each time the frequencies of the input and comparison signals are in agreement.

10. An apparatus as in claim 8, wherein said generating means includes means for generating the control signal so that the control period exceeds one half the period of the frequency variation of the input signal.

11. An apparatus as in claim 8, wherein said generating means includes means for generating the control signal so that the control period exceeds the input period.

12. An apparatus as in claim 8, wherein said generating means includes a step function generator triggered by variations of the frequency of the input signal.

13. An apparatus as in claim 9, wherein said generating means includes a step function generator triggered by variations of the frequency of the input signal.

14. An apparatus as in claim 8, wherein said generating means includes integrating means for integrating the control signal applied to said processing means, said integrating means including a time-integral device having a time constant which is large compared with the changes in the frequency of the input signal.

15. An apparatus as in claim 9, wherein said generating means includes integrating means for integrating the control signal applied to said processing means, said integrating means including a time-integral device having a time constant which is large compared with the changes in the frequency of the input signal.

16. The method of representing the frequency characteristics of an input signal whose frequency varies periodically at a given input period, which comprises the step of generating a frequency variable comparison signal and producing an indicator signal each time the frequency of the comparison signal exhibits a predetermined relation with the frequency of the input signal, the step of generating a periodically varying control signal having a varying value with a control period, the step of varying the comparison frequency on the basis of the varying value of the control signal, the step of sampling the value of the control signal at each indicator and producing an output signal corresponding to the value sampled, the step of generating the control signal including means for generating a control signal whose value varies the comparison frequency of the comparison signal over a range at least as great as the range of frequencies of the input signal and at a period greater than a major fraction of the input period.

17. The method as in claim 16 wherein the step of generating the control signal includes means for generating a control signal whose value varies the comparison frequency of the comparison signal over a range at least as great as the range of frequencies of the input signal and at a period greater than an input period.

* * * * *